Aug. 6, 1968  G. GIAMMARCO  3,395,978
METHOD OF REMOVING ALKALI METAL ARSENATE FROM A SOLUTION
THEREOF CONTAINING ALKALI METAL ARSENITE AND
ALKALI METAL CARBONATE
Filed Sept. 21, 1966
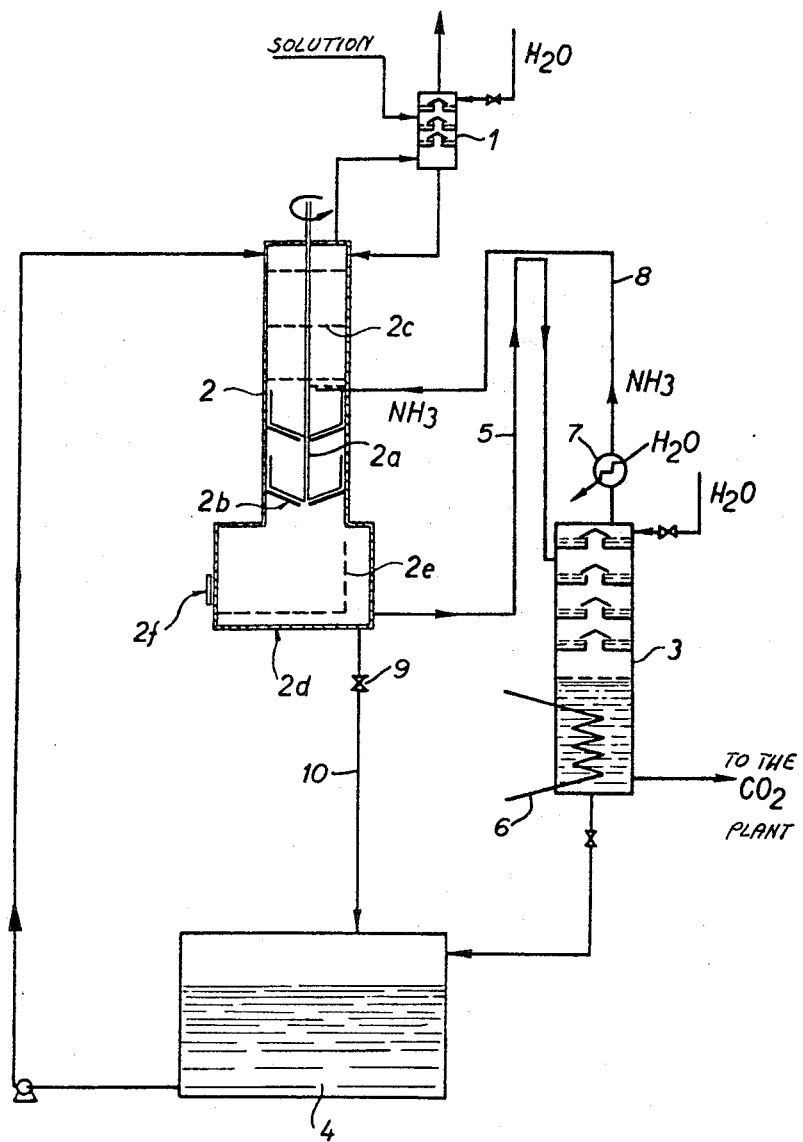
INVENTOR
Giuseppe Giammarco
BY Robert E. Burns
ATTORNEY 3,395,978
METHOD OF REMOVING ALKALI METAL ARSE-
NATE FROM A SOLUTION THEREOF CONTAIN-
ING ALKALI METAL ARSENITE AND ALKALI
METAL CARBONATE
Giuseppe Giammarco, Porto Marghera, Venice, Italy, as-
signor to Montecatini Edison S.p.A., Milan, Italy, a cor-
poration of Italy, and Vetrocoke Societá per Azioni,
Venice, Italy
Continuation-in-part of application Ser. No. 264,591,
Mar. 12, 1963. This application Sept. 21, 1966, Ser.
No. 584,626
Claims priority, application Italy, Mar. 13, 1962,
5,373/62
5 Claims. (Cl. 23—53)

ABSTRACT OF THE DISCLOSURE

Alkali metal arsenate is precipitated from a solution from a decarbonating (carbon dioxide) plant, containing alkali metal carbonate, bicarbonate, arsenite and arsenate, by ammoniating the solution sufficiently to eliminate the bicarbonate therefrom. The ammonia may subsequently be removed from the residual solution by distillation to prepare the solution for return to the carbon dioxide plant.

---

This application is a continuation-in-part of application Ser. No. 264,591, filed Mar. 12, 1963, and now abandoned.

This invention relates to an improvement in my method of decarbonating gaseous mixtures according to my U.S. Patent No. 3,037,844.

In the method of decarbonating gaseous mixtures according to the above mentioned patent, there is employed an aqueous solution of an alkali metal oxide and trivalent arsenic oxide, $As_2O_3$. In a continuous process, the solution is fed to an absorption tower where it is contacted with a gas containing $CO_2$ whereby most of the $CO_2$ is absorbed into the solution and the solution is then fed to a regeneration tower where the solution is boiled or air is passed through the solution whereby most of the absorbed $CO_2$ is expelled from the solution. Up to a molar ratio of $CO_2$ to alkali metal oxide of 1 the absorbed $CO_2$ is in the form of the alkali metal carbonate, and $CO_2$ in excess of this proportion is in the form of the alkali metal bicarbonate.

The conversion of alkali metal bicarbonate to alkali metal carbonate whereby the solution is regenerated and $CO_2$ is recovered requires substantially less energy than the conversion of alkali metal carbonate to alkali metal oxide for the same purpose. Accordingly, it has been found convenient and economical to conduct absorption in the absorption tower to a point at which the molar ratio of the $CO_2$ to alkali metal oxide is in the range of about 1.4 to 1.8 and to regenerate the solution in the regeneration tower to a point at which the molar ratio of the $CO_2$ to the alkali metal oxide is in the range of 1 to about 1.3 and preferably of about 1.05 to about 1.3. It will be appreciated that at a molar ratio of $CO_2$ to alkali metal oxide of 1, all of the alkali metal oxide is present as alkali metal carbonate; of 1.3, 30% of the alkali metal oxide is present as bicarbonate and the balance is present as carbonate; of 1.4, 40 % of the alkali metal oxide is present as bicarbonate and the balance is present as carbonate; and of 1.8, 80% of the alkali metal oxide is present as bicarbonate and the balance is present as carbonate.

Due to the presence of the alkali metal oxide, the $As_2O_3$ may be regarded as alkali metal arsenite. In the regeneration tower, the alkali metal arsenite is exposed to oxygen whereby some of the alkali metal arsenite is oxidized to the alkali metal arsenate. It has been observed that the conversion of the alkali metal arsenite or $As_2O_3$ to arsenate not only decreases the arsenite or $As_2O_3$ concentration, which is the active compound in the process, but also that the very presence of arsenate detrimentally effects the ability of the solution to absorb $CO_2$. When the concentration of the arsenate exceeds about 30 to 50 grams per liter of the solution, it becomes necessary to reduce the concentration of the arsenate in order to efficiently continue the process.

In the above mentioned patent various methods are described of reducing the arsenate to arsenite. Furthermore, it has been suggested to remove the arsenate by precipitating the arsenate as magnesium and ammonium arsenate by treating the solution with magnesium bicarbonate and aqueous ammonia.

According to the present invention, there is provided a novel and particularly convenient method of removing the arsenate. According to the present invention, it has been found that if the alkali in the solution is augmented by introducing ammonia, the arsenate precipitates from the solution as crystals of alkali metal arsenate. The expression, "total alkali" denotes the total number of moles of the original alkali metal oxide together with the ammonia added.

Apparatus by which the method of the present invention may be effected, the parts of which apparatus in and of themselves are individually conventional, is illustrated in the drawing.

A solution of an alkali metal oxide and $As_2O_3$ which has been used in a $CO_2$ absorbing plant and, accordingly, has become charged with alkali metal arsenate along with alkali metal carbonates is fed to a vessel 1. The solution flows from the bottom of the vessel 1 to a vessel 2. The vessel 2 is fed with ammonia vapor. Any quantity of ammonia vapor which is not absorbed in the solution in vessel 2 is absorbed in the solution in vessel 1, as a conduit for the flow of ammonia vapor from vessel 2 to vessel 1 is provided. Thus, vessel 1 serves to prevent the escape of ammonia vapor from the systems.

The vessel 2 is equipped with a stirrer constituting a stirrer shaft 2a mounting stirrer blades. The stirrer blades scrape any crystal deposits from the walls of the vessel 2. Wire gauzes 2c are arranged in the upper portion of the vessel 2 in order to finely subdivide the ammonia vapor stream which flows upwardly countercurrent to the flow of the solution. Conical devices 2b are provided in the lower portion of the vessel 2. The conical devices 2b are each constituted of a sheet of metal of frustoconical shape having in the middle a hole of sufficient diameter for the shaft 2a of the stirrer to extend therethrough and for the solution and the crystals to flow downward therethrough. The devices 2b function as baffles to prevent reverse flow of the solution and crystals from the bottom of the vessel 2 toward the top of vessel 2.

The very bottom portion of the vessel 2 constitutes an enlargement 2d which serves for the collection of the crystals. The enlargement 2d is provided with a filter wire gauze 2e which retains the crystals. The enlargement 2d is also provided with a hatch and manhole 2f whereby periodically access to the enlargement 2d may be effected for removal of the crystals.

The ammoniacal solution which is the filtrate is fed from the enlargement 2d of the container 2 through a conduit 5 to a conventional distilling apparatus 3 as employed on an industrial scale for distilling ammonia contained in ammoniacal solutions. The distilling apparatus 3 is a distilling column provided at the bottom with a steam heated coil 6 of piping for heating the ammoniacal solution and an after-cooler 7 for extracting heat from the ammonia vapors which pass out of the top of the column through a conduit 8. The ammonia vapors are cycled back to the container 2 for absorption into the feed solution from the $CO_2$ absorbing plant. The distilland is cycled back to the $CO_2$ absorbing plant for use as absorbing solution. In the drawing the only ammonia feed to the container 2 illustrated is from distilling apparatus 3; it will, however, be appreciated that ammonia is also fed to the container 2 from any external source in order to make up for unavoidable losses due, for example, to leakage as well as in order to start up this arsenate removal plant.

Periodically, after a period of days or weeks, the apparatus may be shut down for the purpose of removing the crystals accumulated on the filtering wire gauze 2e. At this time, water is fed downward through the vessel 1 and the container 2 and water is also fed downward through the distillation apparatus 3, which is free from distilland; this wash water then flows into vat 4. Also, a valve 9 in a conduit 10 communicating between the bottom of the vessel 2 and vat 4 is opened. Accordingly, the apparatus and the crystals are washed and the resulting solution collects in the vat 4. The crystals are then removed through the manhole 2f. For start-up, the wash water collected by the vat 4 is returned to the container 2 and from there passes to the distilling apparatus 3 and heat, the supply of which had been interrupted for the shut-down, is again supplied to the distilling apparatus.

The distillation is generally conducted at temperatures of up to about 100° C. Since ammonia is considerably more volatile than $CO_2$, the resulting distilland is free of ammonia but contains essentially all of the $CO_2$ of the original feed to the distilling apparatus. A very minor portion of the $CO_2$ is distilled off with the ammonia, and this $CO_2$ tends to combine with ammonia in the conduit conducting the distillate from the distillation column, to form ammonium carbonate which deposits on the walls of the conduit. The provision of an after-cooler 7, mentioned above, localizes the deposition of the ammonium carbonate to that part of the conduit cooled by the after-cooler. Accordingly, periodically only this part of the conduit need be opened to remove the ammonium carbonate deposits.

As shown schematically in the drawing, the vessel 1 may be, for example, a conventional bubble-cap plate scrubbing column and the distillation apparatus 3 may comprise a conventional bubble-cap distillation column.

The crystals collected on the filter wire gauze 2e, which are alkali metal arsenate, are useful in and of themselves, for example as insecticide. On the other hand, these crystals may then be converted back to arsenite by such means as, for example, reducing with reducing agents such as formic acid, sulfur dioxide and the like, as described in the above referred to patent.

The absorbing solution for $CO_2$ absorbing plant is initially constituted by an alkali metal oxide and $As_2O_3$. In the $CO_2$ absorbing plant, $CO_2$ is absorbed into the solution in a molar ratio of the $CO_2$ to the alkali metal oxide in excess of 1 whereby the $CO_2$ forms the carbonate and the bicarbonate of the alkali metal. Furthermore, the $As_2O_3$ in the presence of the alkali metal oxide forms the arsenite of the alkali metal. Moreover, by virtue of contact of the solution with air, some of the alkali metal arsenite is oxidized into the arsenate of the alkali metal. This oxidation is particularly pronounced in the regeneration stage of the carbon dioxide plant in which, as described in the above mentioned patent, the solution is boiled or, preferably, has air passed through it. However, oxidation will occur even in the contacting step due to the fact that the $CO_2$-containing gas which is being treated may also contain oxygen and, moreover, the system is not hermetically sealed from the atmosphere.

The solution leaving the absorbing stage of the $CO_2$ absorbing plant will have a ratio of the $CO_2$ to the alkali metal oxide generally of about 1.4 to 1.8. The solution leaving the regeneration stage of the $CO_2$ absorbing plant will have a ratio of the $CO_2$ to the alkali metal oxide generally of 1 (or about 1.05) to about 1.3. Ideally, it is preferred that the solution to be freed of arsenate according to the present invention be that from the regeneration stage, since this solution will generally contain a particularly high proportion of arsenate, due to the exposure of the solution to air during the regeneration; in other words, by so selecting the solution a lesser volume of solution need be treated to obtain the precipitation of a unit weight of arsenate. In the event that the alkali metal oxide of the absorbing solution is $Na_2O$, when the solution is drawn from the regeneration stage of the $CO_2$ absorbing plant and the alkali content thereof is augmented by the addition of ammonia until the ratio of the $CO_2$ to the total alkali decreases to any value below 1, whereby bicarbonate is eliminated from the solution, the arsenate precipitates as crystals of sodium arsenate. It would appear that the elimination of bicarbonate from the solution renders sodium arsenate less soluble in the solution wereby it precipitates out. It is noted, however, that the arsenate does not precipitate out as potassium arsenate to a great extent, apparently because the elimination of bicarbonate from the solution does not serve to sufficiently lower the solubility of potassium arsenate therein to cause potassium arsenate to precipitate out to a great extent.

When the solution is drawn from the absorbing stage, rather than the regeneration stage, it is found that potassium arsenate will precipitate as readily as sodium arsenate when ammonia is added to lower the $CO_2$ to a total alkali ratio of less than 1. It would appear that the quantity of ammonium carbonate formed upon the augmenting of the alkali content is sufficiently great, when the solution treated is drawn from the absorbing stage of the $CO_2$ absorbing plant, for the solubility of potassium arsenate therein to be sufficiently lowered to cause the potassium arsenate to precipitate out.

The method of removing arsenate from the absorbing solution according to the present invention is particularly advantageous in that the precipitating agent does not essentially alter the composition of the absorbing solution, making reuse of the absorbing solution easy. Thus, the ammonia may subsequently be readily removed by distillation.

The invention will now be further described by reference to the following examples, which are intended to be illustrative rather than limitative and in each of which in the absorbing stage of the $CO_2$ absorbing plant the rate of circulation of the absorbing solution was adjusted for the absorption by the solution of about 25 cubic meters of $CO_2$ per cubic meter of the solution, the volume of the $CO_2$ being calculated at room temperature and normal atmospheric pressure, and the $CO_2$ absorbing plant is as illustrated in FIG. 3 of the above mentioned patent; it is to be appreciated that the details of appropriate absorbing plants are now known to those skilled in the art and the present invention is not concerned with the absorbing plants but rather with the supplementary operation of treating the used absorbing solution for the purpose of precipitating arsenate therefrom:

Example I

The aqueous absorbing solution initially consists of 95 grams per liter of $Na_2O$ and 171.8 grams per liter of $As_2O_3$. The solution is treated according to the present invention upon being drawn from the regenerating stage. 47% of the $As_2O_3$ has been converted to arsenate and the solution also contains $CO_2$ in a molar ratio relative to the $Na_2O$ of 1.25. Gaseous ammonia is introduced into the solution with the composition of the solution changing as the ammonia is introduced in accordance with the following table, in which each substance in the solution is expressed as grams per liter of solution:

| | | | | | | | |
|---|---|---|---|---|---|---|---|
| NH$_3$ | 0 | 16.0 | 36.0 | 41.0 | 48.0 | 66.6 | 85 |
| Na$_2$O | 95 | | | | | | 67.2 |
| As$_2$O$_3$ | 116.9 | 116.5 | 115.0 | 114.8 | 114.5 | 113.5 | 110.8 |
| V As expressed as As$_2$O$_3$ | 54.9 | 54.4 | 30.5 | 26.7 | 23.3 | 12.12 | 8.6 |

The arsenate, i.e., the pentavalent arsenic, is expressed as As$_2$O$_3$ in order to indicate the amount of As$_2$O$_3$ converted to arsenate in the CO$_2$ absorbing plant and remaining in the solution. Thus, it is seen that the concentration of arsenate in the solution strikingly decreases. This is because the arsenate precipitates as crystals. It is also noted that the concentration of the As$_2$O$_3$, i.e., the arsenite, also decreases, though very slightly; this decrease is due to the fact that the crystals are imbibed with a small quantity of the solution. The precipitated crystals are essentially of disodium arsenate, Na$_2$HAsO$_4$, with a small amount of imbibed arsenite.

Example II

The initial absorbing solution contains K$_2$O in a concentration of 203.4 grams per liter and As$_2$O$_3$ in a concentration of 161 grams per liter. The solution is drawn from the regenerating stage for treatment according to the present invention. 47% of the As$_2$O$_3$ has been converted to arsenate and the solution also contains CO$_2$ in a molar ratio relative to the K$_2$O of 1.2. Ammonia is introduced into the solution in the proportion of 100 grams per liter of the solution. Arsenate precipitates as crystals essentially of K$_2$HAsO$_4$, but because of the presence of imbibed solution, analyzes as 65% K$_2$HAsO$_4$ and 35% K$_3$AsO$_4$. The solution then contains 185 grams per liter of K$_2$O, 73.2 grams per liter of As$_2$O$_3$ and 54.1 grams per liter of pentvalent arsenic calculated as As$_2$O$_3$. Thus, it is seen that while some of the arsenate is precipitated a very substantial portion thereof remains in the solution.

Example III

The initial absorbing solution contains 171.44 grams per liter of K$_2$O and 134.80 grams per liter of As$_2$O$_3$. The solution is drawn from the absorbing stage of the absorbing plant. 17% of the As$_2$O$_3$ has been converted to arsenate and the solution also contains CO$_2$ in a molar ratio relative to the K$_2$O of 1.65. Gaseous ammonia is introduced into the solution until the concentration of ammonium in the solution is 180 grams per liter of the solution. The analysis of the residual solution is 168.5 grams per liter of K$_2$O, 109.5 grams per liter of As$_2$O$_3$ and 8.8 grams per liter of pentavalent arsenic expressed as As$_2$O$_3$. The deposited crystals are a mixture of mono- and dipotassium arsenate.

Example IV

The initial absorbing solution contains 180.8 grams per liter of K$_2$O and 133.6 grams per liter of As$_2$O$_3$. The solution to be treated according to the invention is drawn from the absorbing stage of the CO$_2$ absorbing plant at which stage a quantity of CO$_2$ has been absorbed such that the molar ratio of the CO$_2$ relative to the K$_2$O is 1.6. 26% of the As$_2$O$_3$ has been converted to arsenate. Gaseous ammonia is introduced into the solution until the concentration of the ammonia reaches 180 grams per liter of the solution. Crystals precipitate out of the solution, which crystals are a mixture of mono- and dipotassium arsenate. The residual solution contains 175.6 grams per liter of K$_2$O, 95.4 grams per liter of As$_2$O$_3$ and 12.6 grams per liter of pentavalent arsenic expressed as As$_2$O$_3$.

A comparison of Example II with Examples III and IV shows that while some arsenate is removed according to the present invention by treating a K$_2$O-containing absorbing solution drawn from the regenerating stage of the CO$_2$ absorbing plant, the removal of arsenate is substantially greater if the K$_2$O-containing absorbing solution is drawn from the absorbing solution whereby it contains more CO$_2$ and correspondingly more bicarbonate.

The invention is not to be construed as limited to the particular forms disclosed herein, since these are to be regarded as illustrative rather than restrictive.

What I claim and desire to secure by Letters Patent is:

1. A method of removing alkali metal arsenate from an aqueous solution containing alkali metal oxide and trivalent and pentavalent arsenic oxides in the form of alkali metal arsenate and alkali metal arsenite, said solution also containing alkali metal oxide and carbon dioxide in the form of alkali metal carbonate and optionally alkali metal bicarbonate, the molar ratio of the carbon dioxide to the alkali metal oxide in the said solution being at least 1, comprising introducing ammonia into the solution until the ratio of the number of moles of the carbon dioxide in the solution to the total number of moles of the alkali metal oxide and the ammonia is less than 1, whereupon alkali metal arsenate precipitates from the solution.

2. A method according to claim 1, in which the molar ratio in the arsenate-containing solution of carbon dioxide to alkali metal oxide, prior to introducing ammonia therein, is up to 1.8.

3. A method according to claim 1, in which the ammonia is introduced into the arsenate-containing solution as a gas and further comprising freeing the residual solution of the ammonia by distilling the ammonia from the residual solution.

4. A method according to claim 1 in which the alkali metal oxide is potassium oxide, and potassium arsenate is removed from said solution and in which said solution, prior to introducing ammonia therein, contains said carbon dioxide in a molar ratio of the carbon dioxide to the alkali metal oxide of at least about 1.4, whereby said solution contains alkali metal carbonate and alkali metal bicarbonate.

5. A method according to claim 1 in which the alkali metal oxide is sodium oxide, and sodium arsenate is removed from said solution.

References Cited

UNITED STATES PATENTS

| 1,670,307 | 5/1928 | Little | 23—53 |
|---|---|---|---|
| 3,037,844 | 6/1962 | Giammarco | 23—150 |
| 3,086,838 | 4/1963 | Giammarco | 23—2 |

OSCAR R. VERTIZ, *Primary Examiner.*

B. H. LEVENSON, *Assistant Examiner.*